No. 653,308.     E. MORSE.     Patented July 10, 1900.
NUT LOCK.
(Application filed Oct. 19, 1899.)
(No Model.)
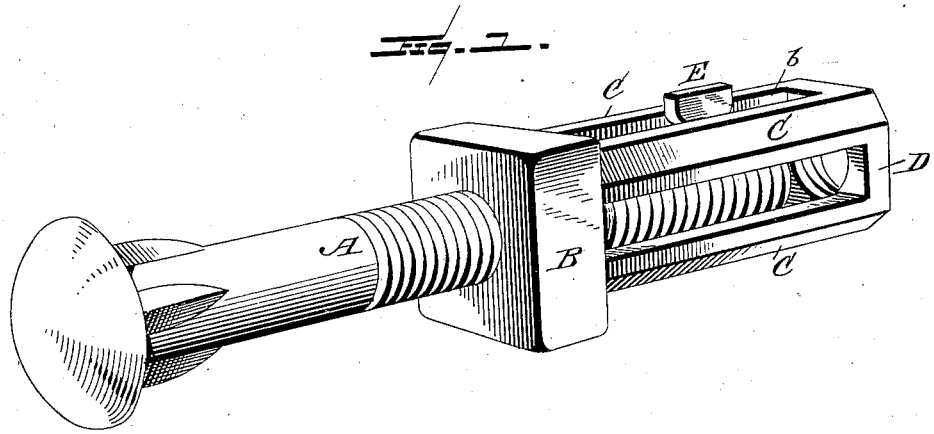
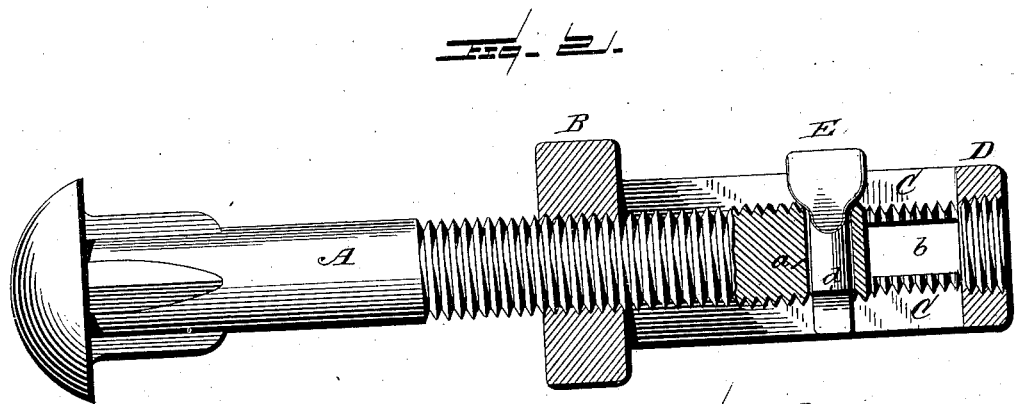
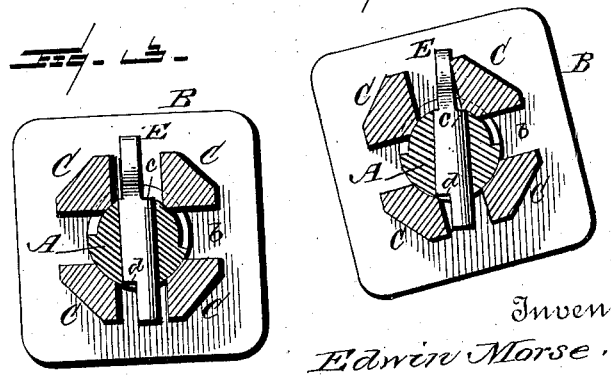
Witnesses:
L. C. Hills
Wm. F. Doyle
Inventor
Edwin Morse,
per Chas. H. Fowler,
Attorney

UNITED STATES PATENT OFFICE.

EDWIN MORSE, OF STOCKTON, ILLINOIS.

NUT-LOCK.

SPECIFICATION forming part of Letters Patent No. 653,308, dated July 10, 1900.

Application filed October 19, 1899. Serial No. 734,084. (No model.)

*To all whom it may concern:*

Be it known that I, EDWIN MORSE, a citizen of the United States, residing at Stockton, in the county of Jo Daviess and State of Illinois, have invented certain new and useful Improvements in Nut-Locks; and I do hereby declare that the following is a full, clear, and exact description of the same, reference being had to the annexed drawings, making a part of this specification, and to the letters of reference marked thereon.

The present invention has relation to that class of nut and bolt locks in which the nut is provided with a slotted tubular extension upon its outer side to receive a transverse key which extends through the same and through a hole in the screw-threaded end of the bolt.

It is the purpose of the invention to improve the construction of the above class of lock-nuts, whereby the key is more securely held in place without the necessity of the employment of the usual spring-keys or other devices heretofore used for preventing the key from being accidentally removed from the bolt; and the invention consists in a lock-nut constructed substantially as shown in the drawings and hereinafter described and claimed.

Figure 1 of the drawings is a perspective view of a nut-lock constructed in accordance with my invention; Fig. 2, a side elevation thereof, partly in section; Fig. 3, an end sectional view; Fig. 4, a similar view showing the nut turned to bring the locking-shoulder of the key under the stay-bar of the nut to prevent said key from being withdrawn.

In the accompanying drawings, A represents a screw-threaded bolt of the usual construction, having a hole *a* near its end and extending at right angles to its axis. The screw-threaded nut B has an extension upon its outer side which comprises the four stay-bars C, with openings between them, as shown at *b*, which bars and openings continue throughout the length of the extension and are joined by a head D. The inner side of the bars C are screw-threaded, as is also the opening through the head D, with which may engage the screw-threads of the bolt A. The elongated openings in the extension require no nicety of adjustment to bring the openings on line with the opening or hole in the bolt, so that the key may be inserted, as in the perforated extensions heretofore in use.

It is preferable that the nut and the extension be integral and the openings of the extension of such width that will readily admit the key E. The head D, which joins the bars C together at their outer ends, may be of any suitable thickness or depth, and the screw-threaded opening therein is of a size to correspond with the diameter of the screw-bolt. The bars C may be of any desirable thickness necessary to give the required strength to the extension.

The nut can be screwed up as tightly as possible against the object through which the bolt passes and held firmly and stationary in that position by the employment of the slotted extension, thereby preventing the nut from rattling or working loose.

The key E is formed with a locking outer shoulder *c*, so that when the nut is turned to the position as indicated in Fig. 4 of the drawings the shoulder will be on line under one of the stay-bars C. This will securely lock the key and prevent it from being accidentally withdrawn, this feature of the invention being considered of material importance, as it dispenses with the usual spring-key or any additional means necessary to hold the key in engagement with the bolt. If desired, a second inner shoulder *d* may be formed on the key to adapt the same for use in a double nut-lock, although this may be dispensed with, if found preferable, as the one shoulder will be sufficient.

It should be noticed that the bars C are threaded throughout their length, thereby giving a firmer hold to the bolt and increasing the strength of the nut and rendering the parts more rigid, this being considered a material advantage.

Having now fully described my invention, what I claim as new, and desire to secure by Letters Patent, is—

1. A nut-lock comprising a screw-threaded bolt having a transverse key-opening, a nut having a plurality of stay-bars and a head interiorly screw-threaded, and a key constructed with a head adapted to occupy a position between two stay-bars, and with a shoulder beneath the head adapted to engage the inner side of a stay-bar to prevent the withdrawal of the key when seated.

2. A nut-lock comprising a screw-threaded bolt having a transverse key-opening, a nut having a plurality of stay-bars and a head interiorly screw-threaded, and a key constructed with a head adapted to occupy a position between two stay-bars, with an inner end adapted to occupy a position between the opposite stay-bars, with an outer shoulder adapted to engage the inner side of the adjacent stay-bar and prevent the withdrawal of the key when seated, and with an inner shoulder adapted to engage the inner side of the opposite stay-bar and limit the inner movement of the key when seated.

In testimony that I claim the above I have hereunto subscribed my name in the presence of two witnesses.

EDWIN MORSE.

Witnesses:
GEO. W. CURTISS,
I. W. PARKINSON.